United States Patent
Chang et al.

(10) Patent No.: US 7,606,299 B2
(45) Date of Patent: Oct. 20, 2009

(54) APPARATUS AND METHOD FOR ESTIMATING A CARRIER-TO-INTERFERENCE-AND-NOISE RATIO IN A COMMUNICATION SYSTEM

(75) Inventors: Jae-Hwan Chang, Suwon-si (KR); Yun-Sang Park, Suwon-si (KR); Sang-Hoon Sung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 666 days.

(21) Appl. No.: 11/172,539

(22) Filed: Jun. 30, 2005

(65) Prior Publication Data

US 2006/0008037 A1    Jan. 12, 2006

(30) Foreign Application Priority Data

Jun. 30, 2004   (KR) .................. 10-2004-0050897

(51) Int. Cl.
*H04B 17/00* (2006.01)
*H03D 1/04* (2006.01)

(52) U.S. Cl. .................... 375/227; 375/346

(58) Field of Classification Search ............. 375/260, 375/285, 346–350; 370/210, 338; 455/135, 455/226.3

See application file for complete search history.

(56) References Cited

U.S. PATENT DOCUMENTS

| 6,456,653 | B1 |  | 9/2002 | Sayeed | |
|---|---|---|---|---|---|
| 7,215,927 | B2 | * | 5/2007 | Miyoshi | 455/45 |
| 7,321,563 | B2 | * | 1/2008 | Kim et al. | 370/252 |
| 2002/0001352 | A1 | * | 1/2002 | Stirling-Gallacher et al. | 375/260 |
| 2003/0218999 | A1 | * | 11/2003 | Ren et al. | 370/335 |
| 2005/0164644 | A1 | * | 7/2005 | Shinoi et al. | 455/69 |
| 2005/0254563 | A1 | * | 11/2005 | Arima | 375/227 |

* cited by examiner

*Primary Examiner*—Khanh C Tran
(74) *Attorney, Agent, or Firm*—The Farrell Law Firm, LLP

(57) ABSTRACT

In an apparatus for estimating a Carrier-to-Interference-and-Noise Ratio (CINR) in a communication system, received signals are blocked based on sub-carriers with similar channel characteristics. Interference and noise levels and true received signal levels are computed on a block-by-block basis from the blocked received signals. CINRs are estimated on a block-by-block basis using ratios between the computed interference and noise levels and the computed true received signal levels. The apparatus can estimate a CINR for all channels even when the channel characteristics of the sub-carriers of the received signals are not similar to each other.

31 Claims, 8 Drawing Sheets

APPARATUS AND METHOD FOR ESTIMATING A CARRIER-TO-INTERFERENCE-AND-NOISE RATIO IN A COMMUNICATION SYSTEM

PRIORITY

This application claims priority to an application entitled "APPARATUS AND METHOD FOR ESTIMATING A CARRIER-TO-INTERFERENCE-AND-NOISE RATIO IN A COMMUNICATION SYSTEM", filed in the Korean Intellectual Property Office on Jun. 30, 2004 and assigned Serial No. 2004-50897, the entire contents of which are incorporated herein by reference.

BACKGROUND OF THE INVENTION

1. Field of the Invention

The present invention relates to an apparatus and method for estimating a Carrier-to-Interference-and-Noise Ratio (CINR) serving as a channel quality criteria in a communication system based on an Orthogonal Frequency Division Multiplexing (OFDM) or an Orthogonal Frequency Division Multiplexing Access (OFDMA).

2. Description of the Related Art

The Orthogonal Frequency Division Multiplexing (OFDM) technique has recently been used to transfer data at a high rate through a wired/wireless channel. The OFDM technique transfers data by means of a plurality of sub-carriers. The OFDM technique converts input serial data into parallel data, modulates the parallel data into a plurality of sub-carriers, that is, sub-channels, with orthogonality, and transfers the modulated data.

This OFDM technique is widely applied to digital transfer technologies such as digital/audio broadcasting, digital TV, Wireless Local Area Network (WLAN), Wireless Asynchronous Transfer Mode (WATM), Broadband Wireless Access (BWA), etc. In the past, the OFDM technique was not widely used due to hardware complexity, but has been recently employed after the development of various digital signal processing technologies including Fast Fourier Transform (FFT) and Inverse Fast Fourier Transform (IFFT). This OFDM technique is similar to a conventional Frequency Division Multiplexing (FDM) technique, but above all can achieve optimal transfer efficiency by transferring a plurality of sub-carriers while maintaining the orthogonality therebetween. Moreover, the OFDM technique can improve the frequency efficiency and is robust against the effects of multipath fading. Further, the OFDM technique is robust against the effects of frequency-selective fading by making use of overlapping frequency spectra and can reduce the effect of intersymbol interference by making use of guard intervals. In terms of hardware, the OFDM technique can employ a simple equalizer and is robust against the effects of impulse noise.

In a communication system based on OFDM/OFDMA, channel signal quality parameters used for Adaptive Power Control (APC), adaptive modulation/demodulation, etc., for example, a Carrier-to-Interference-Noise Ratio (CINR), must be measured. An APC or adaptive modulation/demodulation unit controls power or a modulation/demodulation level according to the measured channel signal quality using a CINR value. The CINR is defined by the total sum of sub-carrier signal power divided by the total sum of noise and interference power, and serves as a criterion for determining channel quality in the communication system.

The prior art for estimating the CINR is disclosed in U.S. Pat. No. 6,456,653 (hereinafter, referred to as the "'653 patent") entitled "FAST AND ACCURATE SIGNAL-TO-NOISE RATIO ESTIMATION TECHNIQUE FOR OFDM SYSTEMS". The '653 patent provides a method for estimating a noise level from unused sub-carriers. An OFDM system performs an IFFT operation on data to be sent by a transmitter and transmits a result of the IFFT operation. When an IFFT size corresponds to N points, only $A_{used}$ sub-carriers are used to encode the signal for transmission to a receiver, and the remaining $(N-A)_{unused}$ sub-carriers are nulled. The $A_{used}$ sub-carriers from among the signals output after an FFT operation by a receiver include data mixed with noise, and the remaining $(N-A)_{unused}$ sub-carriers include only noise. In the '653 patent, the noise level is measured from the $(N-A)_{unused}$ sub-carriers. Under the assumption that the measured noise level is identical to a level of the noise mixed with the data, a true signal level is measured when the measured noise level is subtracted from a level of power received from the $A_{used}$ sub-carriers. A ratio of the true signal level to the noise level becomes an estimate of the targeted Signal-to-Noise ratio (SNR). This SNR is used to determine channel quality in the communication system such as the CINR.

SUMMARY OF THE INVENTION

The above-mentioned conventional SNR estimation technique has a problem in that the estimation performance is seriously degraded when the number of unused sub-carriers $(N-A)_{unused}$ is less than the number of used sub-carriers $A_{used}$. Because interference signals from other users sharing an identical band are not included in the unused sub-carriers, the conventional SNR estimation technique cannot estimate the interference signals.

Accordingly, the present invention has been designed to solve at least the above and other problems occurring in the prior art. Therefore, it is an object of the present invention to provide an apparatus and method for estimating a Carrier-to-Interference-and-Noise Ratio (CINR) in a communication system that estimates the CINR by directly estimating the noise levels of the used sub-carriers.

It is another object of the present invention to provide an apparatus and method for estimating a Carrier-to-Interference-and-Noise Ratio (CINR) in a communication system that blocks or groups sub-carriers with similar channel characteristics, estimates noise levels block by block, and estimates CINRs, block by block, using the estimated noise levels.

It is yet another object of the present invention to provide an apparatus and method for estimating a Carrier-to-Interference-and-Noise Ratio (CINR) in a communication system that blocks or groups sub-carriers with similar channel characteristics, estimates noise levels block by block, and estimates a total CINR using the estimated noise levels.

In accordance with an aspect of the present invention, the above and other objects can be accomplished by an apparatus for estimating a Carrier-to-Interference-and-Noise Ratio (CINR) in a communication system, that includes means for blocking or grouping received signals based on sub-carriers with similar channel characteristics; means for computing block-by-block interference and noise levels and block-by-block true received signal levels from the blocked received signals; and means for estimating block-by-block CINRs using ratios between the computed block-by-block interference and noise levels and the computed block-by-block true received signal levels.

In accordance with another aspect of the present invention, the above and other objects can be accomplished by an apparatus for estimating a Carrier-to-Interference-and-Noise Ratio (CINR) in a communication system, that includes means for blocking or grouping received signals based on sub-carriers with similar channel characteristics; means for computing block-by-block interference and noise levels and block-by-block true received signal levels from the blocked received signals; and means for computing a sum of the block-by-block interference and noise levels and a sum of the block-by-block true received signal levels to produce a total interference and noise level and a total true received signal level, and estimating a total CINR using a ratio of the total true received signal level to the total interference and noise level.

In accordance with another aspect of the present invention, the above and other objects can be accomplished by a method for estimating a Carrier-to-Interference-and-Noise Ratio (CINR) in a communication system, that includes the steps of blocking or grouping received signals based on sub-carriers with similar channel characteristics; computing block-by-block interference and noise levels and block-by-block true received signal levels from the blocked received signals; and estimating block-by-block CINRs using ratios between the computed block-by-block interference and noise levels and the computed block-by-block true received signal levels.

In accordance with yet another aspect of the present invention, the above and other objects can be accomplished by a method for estimating a Carrier-to-Interference-and-Noise Ratio (CINR) in a communication system, that includes the steps of blocking or grouping received signals based on sub-carriers with similar channel characteristics; computing block-by-block interference and noise levels and block-by-block true received signal levels from the blocked received signals; and computing a sum of the block-by-block interference and noise levels and a sum of the block-by-block true received signal levels to produce a total interference and noise level and a total true received signal level, and estimating a total CINR using a ratio of the total true received signal level to the total interference and noise level.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
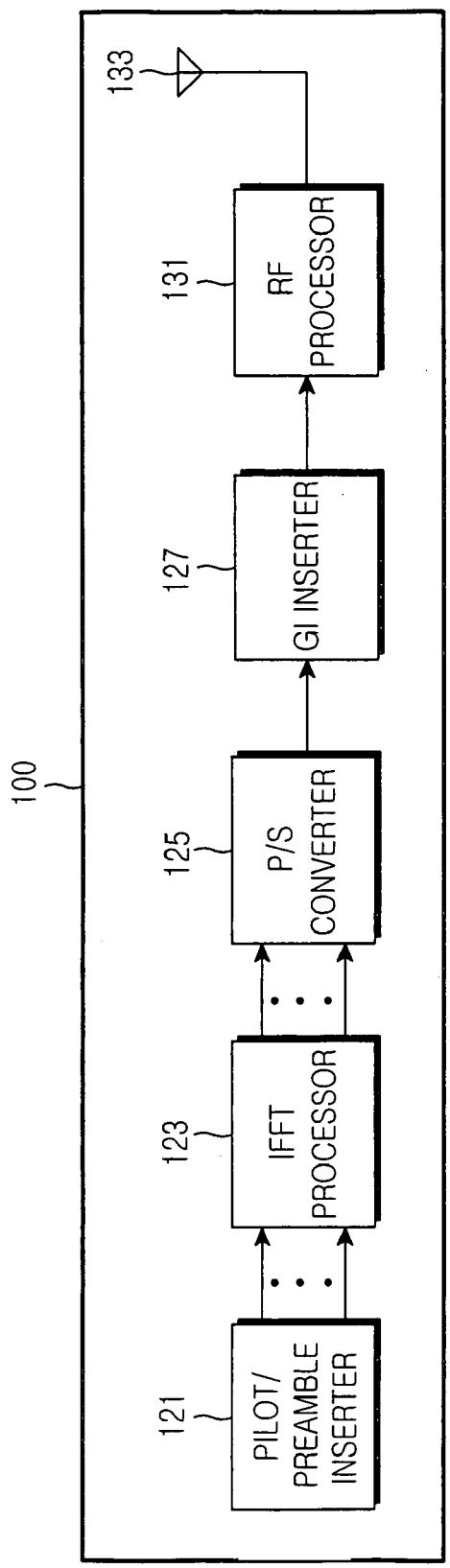
FIG. 1 is a block diagram illustrating a conventional Orthogonal Frequency Division Multiplexing (OFDM) transmitter.

Embodiments of the present invention will be described in detail herein below with reference to the accompanying drawings. In the drawings, the same or similar elements are denoted by the same reference numerals even though they are depicted in different drawings.

In the following description made in conjunction with preferred embodiments of the present invention, a variety of specific elements are shown. The description of such elements has been made only for a better understanding of the present invention. Those skilled in the art will appreciate that the present invention can be implemented without using the above-mentioned specific elements.

Additionally, in the following description, a detailed description of known functions and configurations incorporated herein will be omitted for conciseness.

FIG. 1 is a block diagram illustrating a conventional Orthogonal Frequency Division Multiplexing (OFDM) transmitter. Referring to FIG. 1, an OFDM transmitter 100 includes a pilot/preamble inserter 121, an Inverse Fast Fourier Transform (IFFT) processor 123, a Parallel-to-Serial (P/S) converter 125, a Guard Interval (GI) inserter 127, a Radio Frequency (RF) processor 131, and an antenna 133.

The pilot/preamble inserter 121 generates a plurality of data symbols, and pilot sub-carriers and preambles set in an OFDM communication system, and inserts the generated pilots into the plurality of data symbols. Here, the pilots are inserted into the data symbols for channel estimation. The position of a pilot in a sub-channel is preset the OFDM communication system. A generated preamble is generally positioned at the head of a frame in the form of one OFDMA symbol. As the pilots and preambles used in the embodiment of the present invention use different sequences according to base stations, the performance of the present invention is highly effective when the orthogonality between the base stations is maintained.

The IFFT processor 123 carries out an IFFT operation on the plurality of sub-channels and outputs a result of the IFFT operation to the P/S converter 125. The P/S converter 125 converts input parallel signals into a serial signal and then outputs the serial signal to the GI inserter 127. The GI inserter 127 inserts a GI in order to reduce the effect of Inter Symbol Interference (ISI) between the sub-channels output from the IFFT processor 123. The RF processor 131 transmits channel data input from the GI inserter 127 to a radio channel through the antenna 133.

Figure 2:
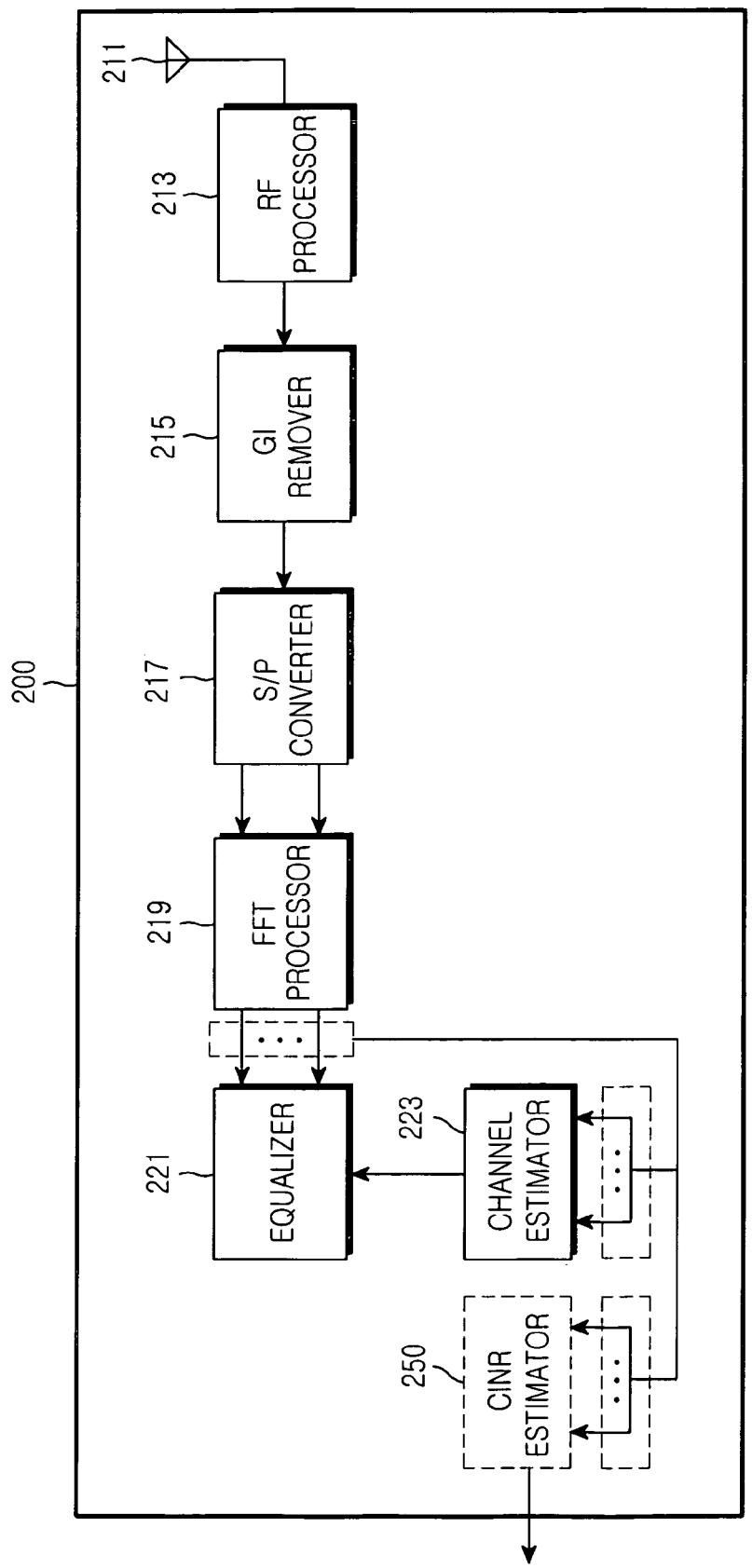
FIG. 2 is a block diagram illustrating an OFDM receiver in accordance with an embodiment of the present invention.

FIG. 2 is a block diagram illustrating an OFDM receiver in accordance with an embodiment of the present invention. Referring to FIG. 2, an OFDM receiver 200 includes an antenna 211, an RF processor 213, a GI remover 215, a Serial-to-Parallel (S/P) converter 217, a Fast Fourier Transform (FFT) processor 219, an equalizer 221, a channel estimator 223, and a Carrier-to-Interference-and-Noise Ratio (CINR) estimator 250.

The RF processor 213 outputs channel data received through the antenna 211 to the GI remover 215. The GI remover 215 removes a GI from the received channel data. The S/P converter 217 converts, into a plurality of parallel data, serial channel data from which the GI has been removed, and then outputs the parallel data to the FFT processor 219. The FFT processor 219 carries out an FFT operation on the parallel channel data from which the GI is removed, and then outputs channel data corresponding to a result of the FFT operation to the equalizer 221. The equalizer 221 removes signal distortion incurred in a communication channel environment from the channel data of the FFT operation result, and then outputs data from which the signal distortion has been removed. The channel estimator 223 estimates a channel state according to the phase and amplitude skew in a frequency domain caused by channel degradation when a transmission and reception function is performed, and then compensates for the phase and amplitude skew in the frequency domain. The CINR estimator 250 estimates channel quality, that is, a CINR.

In the OFDM system as mentioned above, the transmitter performs the IFFT operation on modulated signals, inserts a GI into the signals, and transmits the signals into which the GI has been inserted. The receiver removes the GI from received signals, carries out the FFT operation on the received signals from which the GI has been removed, demodulates a result of the FFT operation, and recovers an original signal.

In accordance with the embodiment of the present invention, the OFDM transmitter sends digital signals with an already known pattern referred to as pilot signals. The OFDM receiver estimates a CINR using the received signals. The present invention uses pilot signals after the FFT operation to estimate the CINR. As an example used herein the pilot signals have a preset sequence and use Binary Phase Shift Keying (BPSK) modulation. The pilot sequence consists of 1's and 0's. It is also assumed in the example that a signal of 1 is a complex signal of 1 and a signal of 0 is a complex signal of −1.

The embodiment of the present invention estimates the power of interference and noise components included in the received signals using the fact that each sub-carrier of the received signals has channel characteristics similar to those of an adjacent sub-carrier. That is, the embodiment of the present invention estimates the power of interference and noise components included in the received signals using a difference between neighboring sub-carriers.

In more detail, the embodiment of the present invention obtains a plurality of pieces of channel data by multiplying the sub-carriers of the received signals by the preset pilot sequence. A division operation is then performed. However, because a value of the preset pilot sequence is 1 or −1, a result of the multiplication operation is identical with that of the division operation. Each piece of channel data includes a signal component and an interference and noise component. Because adjacent sub-carriers have almost identical channel characteristics, the channel data's signal components have almost identical values. Accordingly, when a difference between the channel data pieces obtained from each sub-carrier and at least one adjacent sub-carrier is computed, signal components are cancelled out and only interference and noise components are left.

According to the above-mentioned principle used for the embodiment of the present invention, the interference and noise components included in the channel data pieces are estimated, and the interference and the noise power is estimated from the interference and the noise components. The estimated interference and the noise power is subtracted from the received signal power, and the power of a true signal from which the interference and the noise are eliminated is estimated. A CINR estimate is computed when the true signal power is divided by the noise and the interference power.

Figure 3:
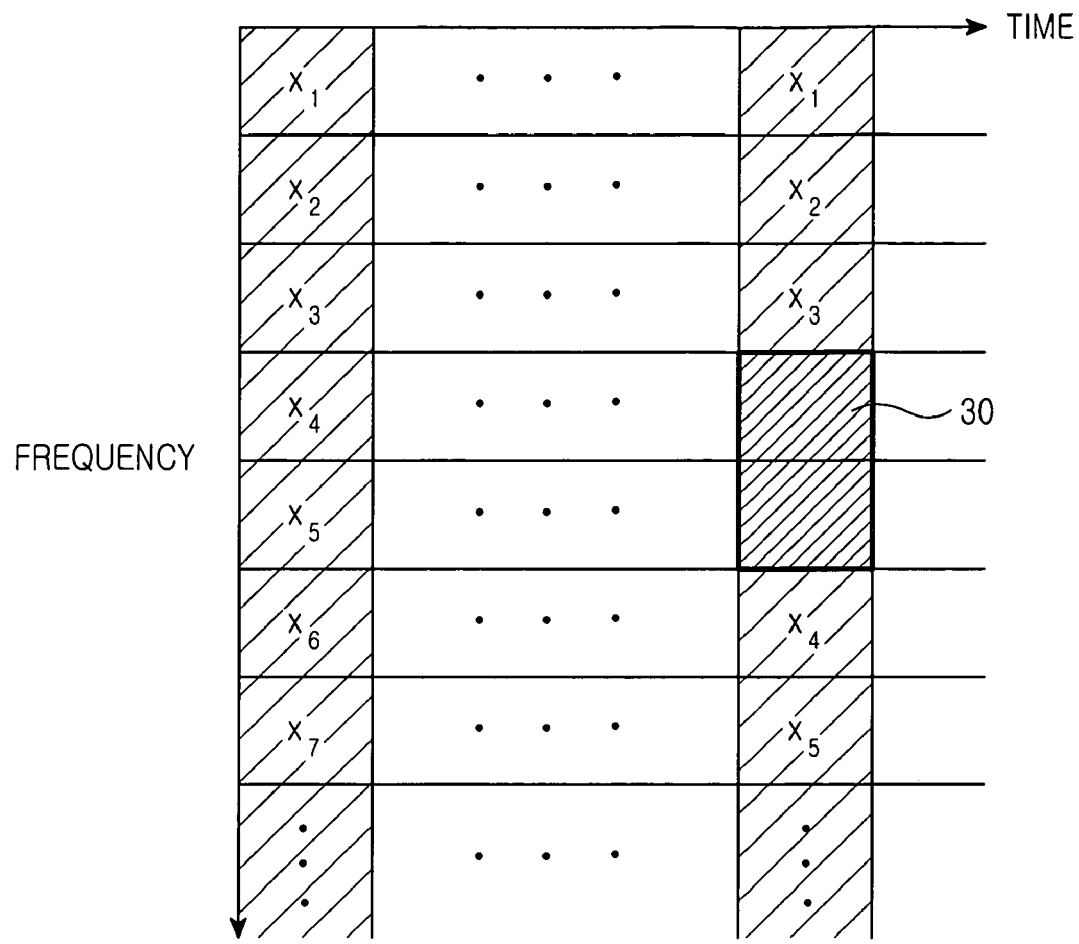
FIG. 3 illustrates sub-carriers of signals received by the OFDM receiver in accordance with an embodiment of the present invention.

FIG. 3 illustrates a plurality of sub-carriers of signals received by the OFDM receiver in accordance with an embodiment of the present invention. Additionally, FIG. 3 illustrates a case where the sub-carriers are present in an identical time domain for one OFDM symbol duration. The embodiment of the present invention uses the fact that each of the sub-carriers has channel characteristics similar to those of an adjacent sub-carrier. When sub-carriers $x_3$ and $x_4$ are not adjacent to each other as indicated by reference numeral 30 in FIG. 3, the similarity of channel characteristics is low. Because the sub-carriers of the received signals may have different channel characteristics as illustrated in FIG. 3, a first embodiment of the present invention blocks or groups $N_i$ (i=1, . . . , B) sub-carriers that are adjacent to each other in a two-dimensional plane with time and frequency axes, estimates an interference and noise level and a true signal level on a block by block basis, and either estimates a CINR, on a block by block basis, using a ratio of the estimated levels.

A second embodiment of the present invention sums the interference and the noise level estimates output on a block by block basis, sums true signal level estimates output on a block by block basis, and estimates a total CINR for the entire signal by obtaining a ratio of the sums.

Figure 4:
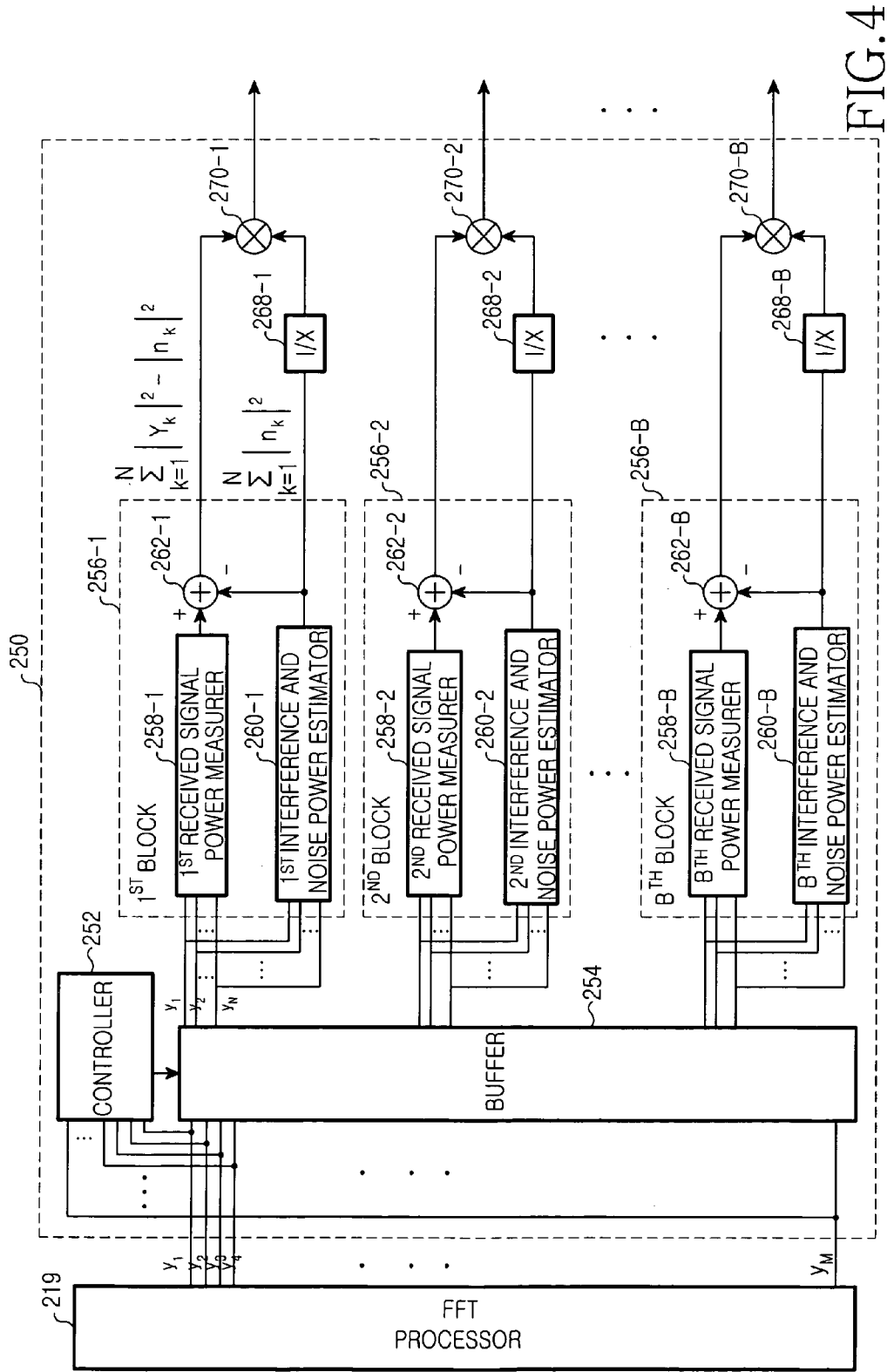
FIG. 4 is a block diagram illustrating a Carrier-to-Interference-and-Noise Ratio (CINR) estimator in accordance with a first embodiment of the present invention.

First, a CINR estimation apparatus and method in accordance with the first embodiment of the present invention will be described. FIG. 4 is a block diagram illustrating a CINR estimator in accordance with the first embodiment of the present invention.

Referring to FIG. 4, the CINR estimator in accordance with the first embodiment of the present invention includes a controller 252, a buffer 254, $1^{st}$ to $B^{th}$ blocks 256-1 to 256-B, block-by-block reciprocal generators 268-1 to 268-B, and block-by-block multipliers 270-1 to 270-B.

The controller 252 receives the pilot signals from the FFT processor 219, analyzes adjacency relations between channels corresponding to sub-carriers, and outputs a control signal according to the adjacency relations between the channels of the received signals. That is, the controller 252 analyzes the adjacency relations between the channels of the received signals output after the FFT operation, blocks or groups the adjacent channels, and outputs control signals such that a predetermined number of blocked signals can be output.

The buffer 254 receives the pilot signals based on the FFT operation output from the FFT processor 219, buffers the pilot signals on a channel by channel basis, and outputs the buffered received signals according to the control signals from the controller 252.

The $1^{st}$ to $B^{th}$ blocks 256-1 to 256-B receive signals based on the FFT operation output from the FFT processor 219 according to the adjacency relations between the channels, estimate the true signal power and the interference and the noise power, on a block by block basis, using the fact that the adjacent channels have similar characteristics, and output a result of the estimation. That is, the $1^{st}$ to $B^{th}$ blocks 256-1 to 256-B estimate and output the $1^{st}$ to $B^{th}$ true signal power values and the $1^{st}$ to $B^{th}$ interference and noise power values. Here, the true signal power is a value of (Total Received Signal Power of Each Block−Interference and Noise Power).

The functions and operations of the $1^{st}$ to $B^{th}$ blocks 256-1 to 256-B will be described in detail. Because the $1^{st}$ to $B^{th}$ blocks 256-1 to 256-B perform similar functions and operations, the $1^{st}$ block will be described as an example.

Figure 5:
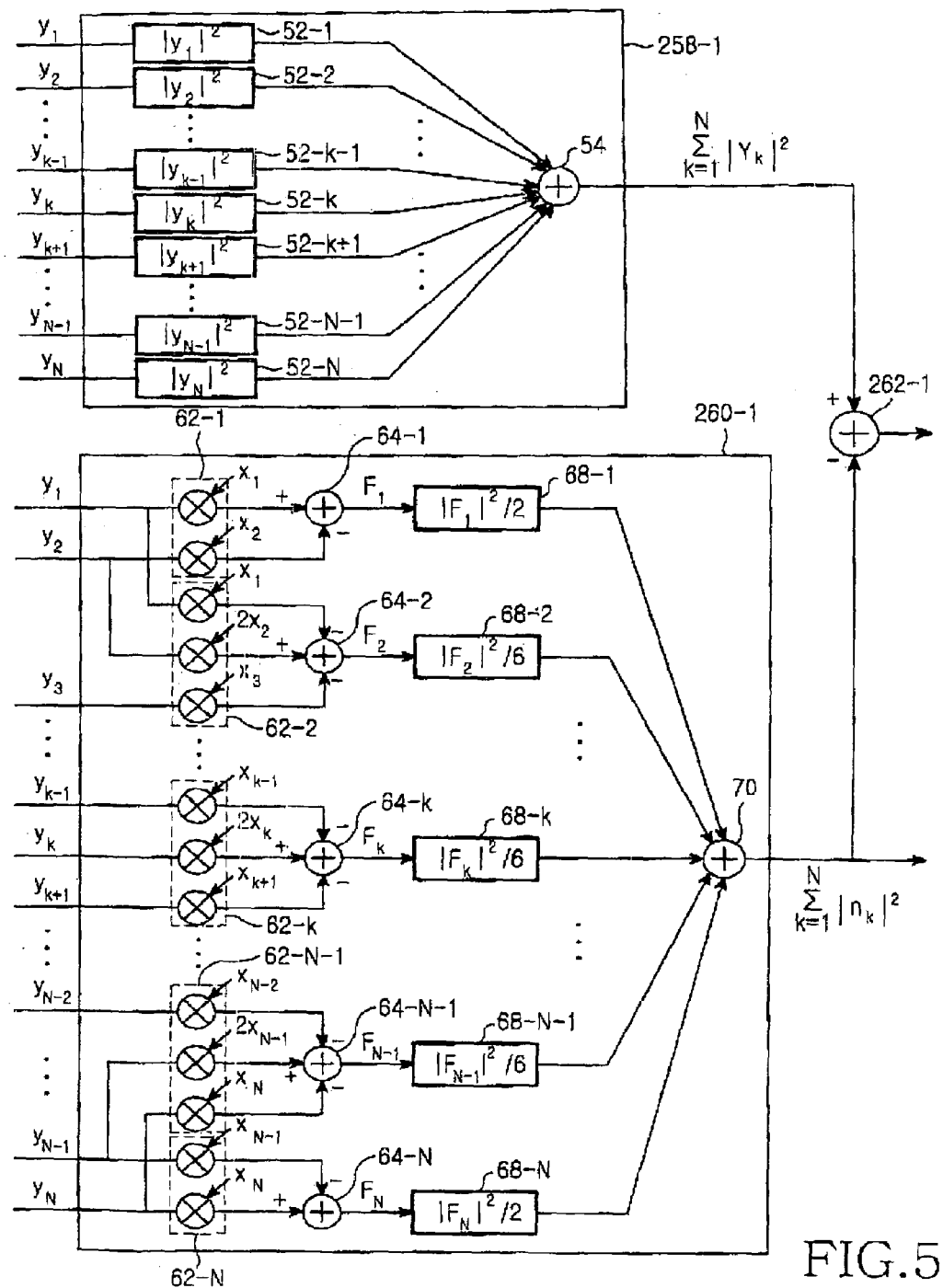
FIG. 5 illustrates blocks for estimating true received signal power and noise power in accordance with an embodiment of the present invention.

FIG. 5 illustrates the $1^{st}$ block 256-1 among the $1^{st}$ to $B^{th}$ blocks 256-1 to 256-B in the CINR estimator 250 in accordance with the embodiment of the present invention. Referring to FIG. 5, the $1^{st}$ block 256-1 includes a $1^{st}$ received signal power measurer 258-1, a $1^{st}$ interference and noise power estimator 260-1, and a $1^{st}$ adder 262-1.

In the embodiment of the present invention, it is assumed that N received signals $y_1$ to $y_N$ based on the FFT operation whose channels are adjacent to each other are input from the buffer 254 to the $1^{st}$ received signal power measurer 258-1 and the $1^{st}$ interference and noise power estimator 260-1 under control of the controller 252.

The 1st received signal power measurer 258-1 computes the power of the N received signals $y_1$ to $y_N$ by means of square operators 52-1 to 52-N. The 1st received signal power measurer 258-1 sums output values of the square operators 52-1 to 52-N by means of an adder 54, and outputs the computed power of the N received signals $y_1$ to $y_N$ as illustrated in Equation 1.

$$\text{Power for } N \text{ received signals } y_1 \text{ to } y_N = \sum_{k=1}^{N} |y_k|^2 \quad (1)$$

The 1st interference and noise power estimator 260-1 computes the respective channel data pieces by multiplying the N received signals $y_1$ to $y_N$ by a preset sequence (e.g., a sequence with Pseudo Noise (PN) or orthogonality multiplied by signals transmitted by the IFFT processor).

In the embodiment of the present invention, it is assumed that a $k^{th}$ transmitted signal in a front stage of the IFFT processor is $x_k$ and a signal corresponding to the $x_k$ in a rear stage of the FFT processor is $y_k$. N signals corresponding to one block can have an arbitrary distribution in the two-dimensional plane with symbol and frequency axes. FIG. 3 illustrates signals distributed in a line along the frequency axis. In actuality, the signals can be distributed in a line along the symbol axis. That is, the application range of the present invention is not limited to a distribution form of the N signals. It is assumed that the pilot signals use BPSK modulation, and $x_k=1$ or $-1$ where $k=1, 2, \ldots, N$. When it is assumed that a channel characteristic value and a noise value between the signals $x_k$ and $y_k$ is $H_k$ and $n_k$, respectively, the received signals based on the FFT operation can be expressed as Equation 2.

$$y_k = H_k x_k + n_k, k=1, 2, \ldots, N \quad (2)$$

In Equation 2, because $x_k$ is a preset pilot sequence, the receiver can identify the preset pilot sequence. $y_k$ is a measured value.

The 1st interference and noise power estimator 260-1 defines a value of $F_k$ as illustrated in Equation 3 in order to separate the noise components after multiplying the N received signals $y_1$ to $y_N$ by $x_k=1$ or $-1$, where $k=1, 2, \ldots, N$. The $F_k$ value is an intermediate value used to estimate the noise components.

$$F_1 = x_1^* y_1 - x_2^* y_2,$$

$$F_k = 2x_k^* y_k - x_{k-1}^* y_{k-1} - x_{k+1}^* y_{k+1}, k=2, 3, \ldots, N-1$$

$$F_N = x_N^* y_N - x_{N-1}^* y_{N-1} \quad (3)$$

As illustrated in FIG. 5, the multipliers 62-1 to 62-N multiply the N received signals $y_1$ to $y_N$ by $x_k=1$ or $-1$ where $k=1, 2, \ldots, N$. In order to obtain the noise components from the outputs of the multipliers 62-1 to 62-N, the corresponding sub-carrier outputs are input into the positive input terminals of the N adders 64-1 to 64-N, and the outputs of the sub-carriers that are adjacent to the corresponding sub-carrier outputs are input into the negative input terminals of the N adders 64-1 to 64-N.

Accordingly, the N adders 64-1 to 64-N output the differences between corresponding sub-carriers and adjacent sub-carriers thereof, such that the signal components are cancelled out and only the noise components are left.

As illustrated in FIG. 5, a signal adjacent to the 1st signal $y_1$ of the N received signals $y_1$ to $y_N$ is $y_2$, and a signal adjacent to the last signal $y_N$ is $y_{N-1}$. The number of signals adjacent to each of the other signals is 2. For example, there are two signals that are adjacent to $y_k$ are $y_{k-1}$ and $y_{k+1}$. An adjacently received signal multiplied by a transmitted signal of an adjacent sub-carrier is subtracted from the 1st or last signal $y_1$ or $y_N$ of the N received signals $y_1$ to $y_N$ multiplied by a transmitted signal of a corresponding sub-carrier. Adjacently received signals that are respectively multiplied by transmitted signals of two adjacent sub-carriers are subtracted from the signal $y_k$ multiplied by twice a transmitted signal of a corresponding sub-carrier. When the signal components are cancelled out and only the noise components are left according to the above-mentioned principle, the result values of $F_1$ to $F_N$ are computed.

When the number of the sub-carriers within the block is small, the computation of the difference between the two sub-carriers located at a boundary, that is, a computation for subtracting an adjacently received signal multiplied by a transmitted signal of an adjacent sub-carrier from the 1st or last signal $y_1$ or $y_N$ of the N received signals $y_1$ to $y_N$ multiplied by a transmitted signal of a corresponding sub-carrier, can be omitted. However, because such omission can affect the performance, it is preferred that the above-described computation is not omitted.

When the results of Equation 2 are plugged into Equation 3, the signal components and the interference and noise components are expressed as illustrated in Equation 4.

$$F_1 = H_1 |x_1|^2 - H_2 |x_2|^2 + (x_1^* n_1 - x_2^* n_2),$$

$$F_k = 2H_k |x_k|^2 - H_{k-1} |x_{k-1}|^2 - H_{k+1} |x_{k+1}|^2 + (2x_k^* n_k - x_{k-1}^* n_{k-1} - x_{k+1}^* n_{k+1}),$$

$$k=2, 3, \ldots, N-1,$$

$$F_N = H_N |x_N|^2 - H_{N-1} |x_{N-1}|^2 + (x_N^* n_N - x_{N-1}^* n_{N-1}) \quad (4)$$

In Equation 4, the values of the terms before the parentheses correspond to the signal components, and the values within the parentheses correspond to the noise components. In this case, when it is assumed that the adjacent sub-carrier channels have almost identical channel characteristics, Equation 4 can be rewritten as Equation 5.

$$H_k \approx H_{k-1} \approx H_{k+1} \quad (5)$$

The values before the parentheses become 0 in Equation 4. The signal components are cancelled out and only the noise components are left. When the noise components are squared, the noise power is estimated. That is, when the noise components within the parentheses in Equation 4 are squared, a power value of $F_k$ can be expressed by Equation 6.

$$|F_1|^2 = |n_1|^2 + |n_2|^2 - 2x_1 x_2 Re\{n_1^* n_2\},$$

$$|F_k|^2 = 4|n_k|^2 + |n_{k-1}|^2 + |n_{k+1}|^2 - 4x_k x_{k+1} Re\{n_k^* n_{k+1}\}$$

$$-4x_k x_{k-1} Re\{n_k^* n_{k-1}\} + 2x_{k+1} x_{k-1} Re\{n_{k+1}^* n_{k-1}\},$$
$$k=2, 3, \ldots, N-1,$$

$$|F_N|^2 = |n_N|^2 + |n_{N-1}|^2 - 2x_N x_{N-1} Re\{n_N^* n_{N-1}\} \quad (6)$$

In order to compute a sum of the values $|F_k|^2$, $K_k$ is defined by Equation 7.

$$K_k = -4x_k x_{k+1} Re\{n_k^* n_{k+1}\} - 4x_k x_{k-1} Re\{n_k^* n_{k-1}\} + 2x_{k+1} x_{k-1} Re\{n_{k+1}^* n_{k-1}\} \quad (7)$$

When Equation 7 is plugged into $|F_k|^2$ of Equation 6, Equation 8 is obtained.

$$\sum_{k=2}^{N-1} |F_k|^2 = \sum_{k=2}^{N-1} (4|n_k|^2 + |n_{k-1}|^2 + |n_{k+1}|^2) + \sum_{k=2}^{N-1} K_k \quad (8)$$

In Equation 8, the value of $$\sum_{k=2}^{N-1} K_k$$

is close to zero, because the pilot sequence is the PN sequence or the number of 1s is similar to the number of −1s in the pilot sequence. Because the noise components have a mean value of 0 and are independent of each other, Equation 9 is obtained.

$$\sum_{k=2}^{N-1} x_{k+a} x_{k+b} \operatorname{Re}\{n^*_{k+a} n_{k+b}\} \approx 0, \quad (9)$$

for $(a, b) = (0, 1), (0, -1), (1, -1)$

Equation can be rewritten as Equation 10.

$$\sum_{k=2}^{N-1} K_k \approx 0 \quad (10)$$

Because $F_1$ of the 1$^{st}$ signal $y_1$ of the N signals or $F_N$ of the last signal $y_n$ of the N signals has two noise components, $F_1$-squared or $F_N$-squared is divided by 2. Because $F_k$ of each of the other signals has six noise components including four $|n_k|^2$ elements, one $|n_{k-1}|^2$ element, and one $|n_{k+1}|^2$ element, $F_k$-squared is divided by 6. This operation is carried out by N arithmetic operators 68-1 to 68-N as illustrated in FIG. 5. An adder 70 adds all of the noise power values as illustrated in Equation 11.

$$\sum_{k=1}^{N} |n_k|^2 = \quad (11)$$

$$\frac{|F_1|^2}{2} + \frac{|F_N|^2}{2} + \sum_{k=2}^{N-1} \frac{|F_k|^2}{6} + \frac{1}{3}(|n_1|^2 + |n_N|^2 - |n_2|^2 - |n_{N-1}|^2) +$$

$$x_1 x_2 \operatorname{Re}\{n^*_1 n_2\} + x_N x_{N-1} \operatorname{Re}\{n^*_N n_{N-1}\} - \frac{1}{6} \sum_{k=2}^{N-1} K_k$$

Because the values within the parentheses and the values of the terms after the parentheses are very small values as compared with a total value in Equation 11, they may be ignored. Accordingly, the total noise power can be estimated using Equation 12.

$$\sum_{k=1}^{N} |n_k|^2 = \frac{|F_1|^2}{2} + \frac{|F_N|^2}{2} + \sum_{k=2}^{N-1} \frac{|F_k|^2}{6} \quad (12)$$

When the value of N is sufficiently large, the last two terms in Equation 12 can be omitted.

A received signal power value of the N received signals $y_1$ to $y_N$ measured by the 1$^{st}$ received signal power measurer 258-1 is input to the positive input terminal of the 1$^{st}$ adder 262-1. An interference and noise power value of the N received signals $y_1$ to $y_N$ estimated by the 1$^{st}$ interference and noise power estimator 260-1 is input to the negative input terminal of the 1$^{st}$ adder 262-1. The 1$^{st}$ adder 262-1 subtracts the interference and noise power value of the N received signals $y_1$ to $y_N$ from the received signal power value of the N received signals $y_1$ to $y_N$, and then outputs a true signal power value of the N received signals $y_1$ to $y_N$, can be expressed as Equation 13.

$$\sum_{k=1}^{N} |y_k - n_k|^2 = \sum_{k=1}^{N} |y_k|^2 + |n_k|^2 - 2\operatorname{Re}\{n^*_k(H_k x_k + n_k)\} \quad (13)$$

$$= \sum_{k=1}^{N} |y_k|^2 - \sum_{k=1}^{N} |n_k|^2 - \sum_{k=1}^{N} 2\operatorname{Re}\{n^*_k H_k x_k\}$$

Because the last term in Equation 13 can be ignored, the embodiment of the present invention approximates Equation 13 to a value of (Received Signal Power−Noise Power) for the N received signals $y_1$ to $y_N$. In this case, a true received signal power value of the N received signals $y_1$ to $y_N$ is obtained as illustrated in Equation 14.

$$\sum_{k=1}^{N} |y_k - n_k|^2 \approx \sum_{k=1}^{N} |y_k|^2 - \sum_{k=1}^{N} |n_k|^2 \quad (14)$$

Through the above-mentioned process and in accordance with the embodiment of the present invention, the 1$^{st}$ block 256-1 computes a true received signal power value of the N received signals $y_1$ to $y_N$ and a noise power value of the N received signals $y_1$ to $y_N$. The above-mentioned embodiment of the present invention has been described with respect to the 1$^{st}$ block 256-1 as an example. However, those skilled in the art will appreciate that the 2$^{nd}$ to B$^{th}$ blocks 256-2 to 256-B can compute a true received signal power value and a noise power value according to the principles used for the 1$^{st}$ block 256-1.

That is, the 1$^{st}$ to B$^{th}$ blocks 256-1 to 256-B output true received signal power values and noise power values on a block by block basis according to the above-mentioned principles.

In FIG. 4, the block-by-block reciprocal generators 268-1 to 268-B receive block-by-block noise power values from the 1$^{st}$ to B$^{th}$ blocks 256-1 to 256-B and then output reciprocals of the received noise power values.

The block-by-block multipliers 270-1 to 270-B multiply the true received signal power values output on a block by block basis from the 1$^{st}$ to B$^{th}$ blocks 256-1 to 256-B by the reciprocals of the received noise power values output from the block-by-block reciprocal generators 268-1 to 268-B, and then output CINR estimates for the blocked received signals on a block by block basis.

Figure 6:
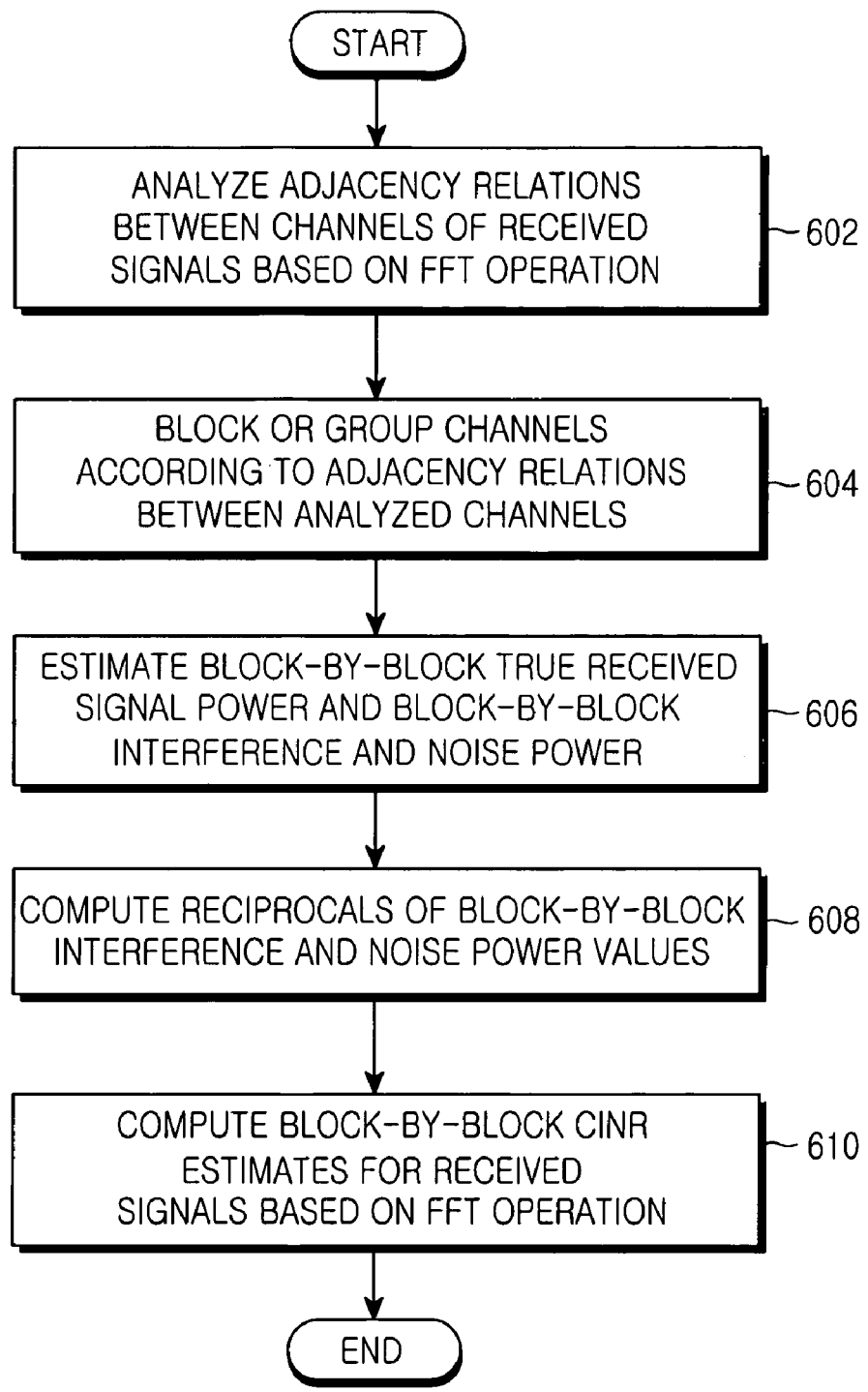
FIG. 6 is a flow chart illustrating a CINR estimation method in accordance with the first embodiment of the present invention.

FIG. 6 is a flow chart illustrating a CINR estimation method in accordance with the first embodiment of the present invention. A CINR estimation process through the CINR estimator in accordance with the first embodiment of the present invention will be described with reference to FIGS. 4 to 6.

Referring to FIG. 6, the CINR estimator 250 receives pilot signals $y_1$ to $y_M$ from the FFT processor 219 through the controller 252 as illustrated in FIG. 4, and analyzes for adjacency relations between channels corresponding to the sub-carriers in step 602. The CINR estimator 250 blocks or groups the pilot signals $y_1$ to $y_M$ according to the results of the analyzed adjacency relations between the channels in step 604. That is, the CINR estimator 250 blocks or groups adjacent channels according to the analyzed adjacency relations between the channels corresponding to the pilot signals $y_1$ to $y_M$ temporarily stored in the buffer 254 through the controller 252 and then outputs the pilot signals on a block by block basis.

The CINR estimator 250 estimates the true received signal power and the interference and the noise power on a block by block basis in step 606. That is, the CINR estimator 250 estimates the true received signal power and the interference and the noise power from pilot signals corresponding to each block by means of each of the $1^{st}$ to $B^{th}$ blocks 256-1 to 256-B.

In step 608, the CINR estimator 250 generates the reciprocals of the interference and the noise power values estimated on a block by block basis by the block-by-block reciprocal generators 268-1 to 268-B. In step 610, the CINR estimator 250 computes CINR estimates for the received signals based on an FFT operation on a block by block basis. That is, the CINR estimator 250 outputs the CINR estimates by multiplying the true received signal power values and the reciprocals of the interference and the noise power values on a block by block basis by the block-by-block multipliers 270-1 to 270-B.

As mentioned above, the CINR estimation apparatus and method in accordance with the first embodiment of the present invention can estimate the interference and the noise levels and the received signal levels on a block by block basis, and can estimate the CINRs on a block by block basis by computing a ratio of the estimated levels. A CINR can be accurately estimated even when the channel characteristics of the sub-carriers of the received signals are not similar to each other.

Figure 7:
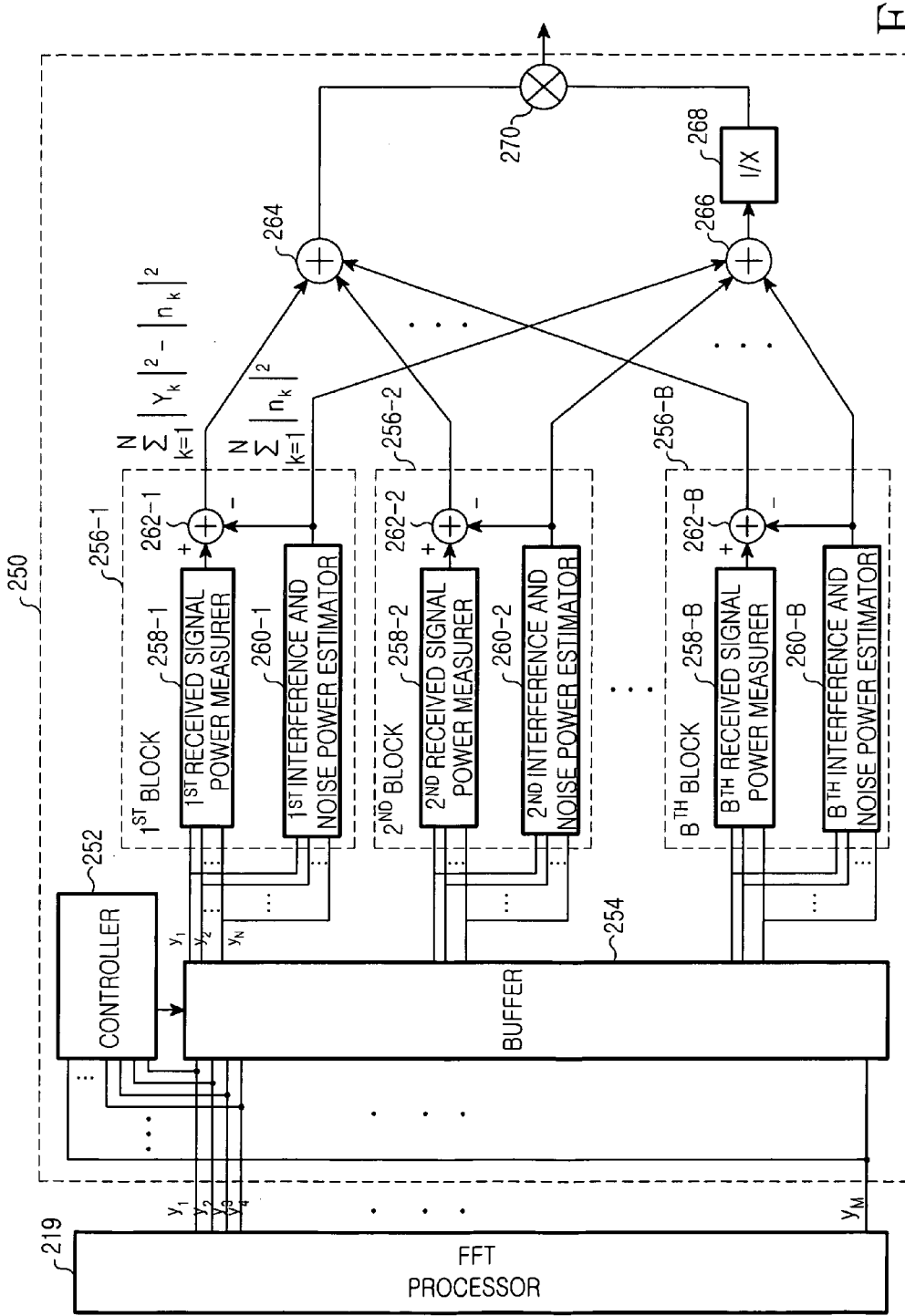
FIG. 7 is a block diagram illustrating the CINR estimator in accordance with a second embodiment of the present invention.

Next, the CINR estimation apparatus and method in accordance with a second embodiment of the present invention will be described with reference to FIGS. 7 and 8. FIG. 7 is a block diagram illustrating the CINR estimator 250 in accordance with the second embodiment of the present invention. Referring to FIG. 7, the CINR estimator 250 includes a controller 252, a buffer 254, $1^{st}$ to $B^{th}$ blocks 256-1 to 256-B, an adder 264 for adding the true signal power estimates, an adder 266 for adding the interference and the noise power estimates, a reciprocal generator 268, and a multiplier 270.

The controller 252, the buffer 254, and the $1^{st}$ to $B^{th}$ blocks 256-1 to 256-B have the same functions as in the CINR estimator in accordance with the first embodiment of the present invention. Accordingly, a description of these components will be omitted.

The adder 264 outputs a sum of the $1^{st}$ to $B^{th}$ true received signal power estimates output from the $1^{st}$ to $B^{th}$ blocks 256-1 to 256-B. The adder 266 outputs a sum of the $1^{st}$ to $B^{th}$ interference and the noise power estimates.

The reciprocal generator 268 outputs a reciprocal of the sum of the $1^{st}$ to $B^{th}$ interference and the noise power estimates from the adder 266. The multiplier 270 outputs a total CINR estimate for all of the received signals $y_1$ to $y_M$ based on the FFT operation by multiplying the sum of the $1^{st}$ to $B^{th}$ true received signal power estimates output from the adder 264 by the reciprocal of the sum of the $1^{st}$ to $B^{th}$ interference and the noise power estimates output from the reciprocal generator 268.

The CINR estimator in accordance with the second embodiment of the present invention uses the two sub-carriers adjacent to each sub-carrier. When W adjacent sub-carriers are used, Equation 4 can be rewritten as Equation 15.

$$F_k = 2W x_k^* y_k - \sum_{m=1}^{W} x_{k-m}^* y_{k-m} - \sum_{m=1}^{W} x_{k+m}^* y_{k+m} \quad (15)$$

Accordingly, Equation 12 for computing the noise power can be rewritten as Equation 16.

$$\sum_{k=1}^{N} |n_k|^2 = \frac{|F_1|^2}{2} + \frac{|F_N|^2}{2} + \sum_{k=2}^{W} \frac{|F_k|^2 + |F_{N+1-k}|^2}{4(k-1)^2 + 2(k-1)} + \sum_{k=1+W}^{N-W} \frac{|F_k|^2}{4W^2 + 2W} \quad (16)$$

As mentioned above, the CINR estimator in accordance with the second embodiment of the present invention blocks or groups the sub-carriers with similar channel characteristics, estimates the true received signal power and the interference and the noise power, and estimates a CINR for all of the channels according to a result of the power estimation.

Figure 8:
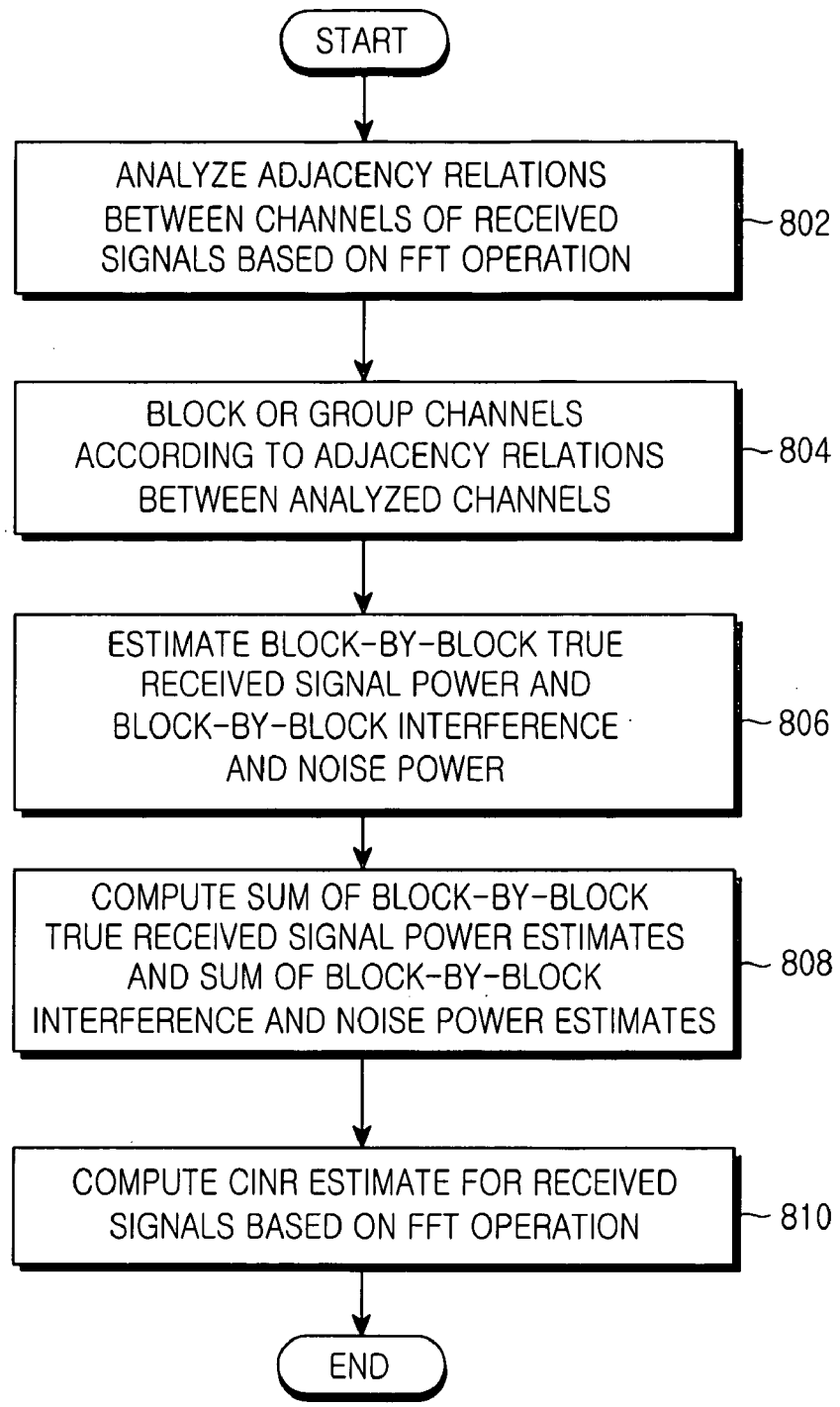
FIG. 8 is a flow chart illustrating the CINR estimation method in accordance with the second embodiment of the present invention.

FIG. 8 is a flow chart illustrating the CINR estimation method in accordance with the second embodiment of the present invention. The CINR estimation method will be described with reference to FIGS. 7 and 8.

Referring to FIG. 8, the CINR estimator 250 receives the pilot signals $y_1$ to $y_M$ from the FFT processor 219 through the controller 252 as illustrated in FIG. 7, and analyzes the adjacency relations between the channels corresponding to sub-carriers in step 802. Subsequently, the CINR estimator 250 blocks or groups the pilot signals $y_1$ to $y_M$ according to the analyzed adjacency relations between the channels in step 804. That is, the CINR estimator 250 blocks or groups adjacent channels according to the analyzed adjacency relations between the channels corresponding to the pilot signals $y_1$ to $y_M$ temporarily stored in the buffer 254 through the controller 252 and then outputs the pilot signals on a block by block basis.

The CINR estimator 250 estimates the true received signal power and the interference and the noise power on a block by block basis in step 806. That is, the CINR estimator 250 estimates the true received signal power and the interference and the noise power from pilot signals corresponding to each block by means of each of the $1^{st}$ to $B^{th}$ blocks 256-1 to 256-B.

In step 808, the CINR estimator 250 computes a sum of the block-by-block true received signal power estimates and a sum of the block-by-block interference and the noise power estimates. Subsequently, in step 810, the CINR estimator 250 computes a reciprocal of the sum of the block-by-block interference and the noise power estimates, multiplies the sum of the block-by-block true received signal power estimates by the reciprocal of the sum of the block-by-block interference and the noise power estimates, and outputs a CINR estimate for all of the received signals based on the FFT operation.

As mentioned above, the present invention can block or group sub-carriers with similar channel characteristics, estimate interference and noise levels and received signal levels on a block by block basis, and estimate CINRs on a block by block basis by computing a ratio of the estimated levels, in a communication system. Moreover, the present invention can accurately estimate a CINR even when the channel characteristics of the sub-carriers of the received signals are not similar to each other.

Further, the present invention can block or group sub-carriers with similar channel characteristics, estimate the true received signal power and the interference and the noise power on a block by block basis, and estimate a CINR for all of the channels according to a result of the power estimation. Moreover, the present invention can estimate a CINR for all of the channels even when the channel characteristics of sub-carriers of the received signals are not similar to each other.

Additionally, the present invention can improve the performance of the Adaptive Power Control (APC) or the Adaptive Modulation and Coding (AMC) unit by providing a relatively accurate CINR estimate.

Although the certain embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. An apparatus for estimating a Carrier-to-Interference-and-Noise Ratio (CINR) in a communication system, comprising:
    means for blocking received signals based on sub-carriers with similar channel characteristics;
    means for computing interference and noise levels on a block-by-block basis and true received signal levels on a block-by-block basis from the blocked received signals; and
    means for estimating CINRs on a block-by-block basis using ratios between the computed interference and noise levels and the computed true received signal levels,
    wherein the computing means further includes received signal level measurers for measuring levels of the blocked received signals and computing and outputting a sum of the received signal levels, interference and noise level estimators for estimating interference and noise levels of the blocked received signals and computing and outputting a sum of the interference and noise levels, and subtracters for subtracting the sum of the interference and noise levels from the sum of the received signal levels, and outputting a result of the subtraction.

2. The apparatus of claim 1, wherein the blocking means comprises:
    a buffer for buffering the received signals on a sub-carrier by sub-carrier basis; and
    a controller for analyzing adjacency relations between the received signals on a sub-carrier by sub-carrier basis, and blocking sub-carriers with the similar channel characteristics.

3. The apparatus of claim 1, wherein each of the received signal level measurers computes absolute values of the blocked received signals, and squares the absolute values to measure the levels of the blocked received signals.

4. The apparatus of claim 1, wherein each of the interference and noise level estimators multiplies the blocked received signals by a pilot sequence to produce channel signals of the blocked received signals, squares a difference value between each of the produced channel signals and at least one adjacent channel signal, and divides the squared value by a predetermined value according to a position of each of the blocked received signals to estimate interference and noise power of the blocked received signals.

5. The apparatus of claim 4, wherein the predetermined value is set to 2 when a blocked received signal is located at a boundary of a block.

6. The apparatus of claim 4, wherein the predetermined value is set to 6 when a blocked received signal is not located at a boundary of a block.

7. An apparatus for estimating a Carrier-to-Interference-and-Noise Ratio (CINR) in a communication system, comprising:
    means for blocking received signals based on sub-carriers with similar channel characteristics;
    means for computing interference and noise levels on a block-by-block basis and true received signal levels on a block-by-block basis from the blocked received signals; and
    means for computing a sum of the interference and noise levels and a sum of the true received signal levels to produce a total interference and noise level and a total true received signal level, and estimating a total CINR using a ratio of the total true received signal level to the total interference and noise level.

8. The apparatus of claim 7, wherein the blocking means comprises:
    a buffer for buffering the received signals on a sub-carrier by sub-carrier basis; and
    a controller for analyzing adjacency relations between the received signals on a sub-carrier by sub-carrier basis, and blocking sub-carriers with the similar channel characteristics.

9. The apparatus of claim 8, wherein the means for estimating the total CINR comprises:
    a first adder for computing the sum of the interference and noise levels;
    a second adder for computing the sum of the true received signal levels; and an arithmetic operator for dividing the sum of the true received signal levels computed by the second adder by the sum of the interference and noise levels computed by the first adder, and computing a CINR estimate for all the received signals.

10. The apparatus of claim 7, wherein the means for computing the interference and noise levels and the true received signal levels comprises:
    received signal level measurers for measuring levels of the blocked received signals, and computing and outputting a sum of the received signal levels;
    interference and noise level estimators for estimating interference and noise levels of the blocked received signals, and computing and outputting a sum of the interference and noise levels; and
    subtracters each subtracting the sum of the interference and noise levels from the sum of the received signal levels, and outputting a true received signal level estimate.

11. The apparatus of claim 10, wherein each of the received signal level measurers computes absolute values of the blocked received signals, and squares the absolute values to measure the levels of the blocked received signals.

12. The apparatus of claim 10, wherein each of the interference and noise level estimators multiplies the blocked received signals by a pilot sequence to produce channel signals of the blocked received signals, squares a difference value between each of the produced channel signals and at least one adjacent channel signal, and divides the squared value by a predetermined value according to a position of each of the blocked received signals to estimate interference and noise power of the blocked received signals.

13. The apparatus of claim 12, wherein the predetermined value is set to 2 when a blocked received signal is located at a boundary of a block.

14. The apparatus of claim 12, wherein the predetermined value is set to 6 when a blocked received signal is not located at a boundary of a block.

15. The apparatus of claim 10, wherein the means for estimating the total CINR comprises:
a first adder for computing the sum of the interference and noise levels;
a second adder for computing the sum of the true received signal levels; and an arithmetic operator for dividing the sum of the true received signal levels computed by the second adder by the sum of the interference and noise levels computed by the first adder, and computing a CINR estimate for all the received signals.

16. The apparatus of claim 7, wherein the means for estimating the total CINR comprises:
a first adder for computing the sum of the interference and noise levels;
a second adder for computing the sum of the true received signal levels; and
an arithmetic operator for dividing the sum of the true received signal levels computed by the second adder by the sum of the interference and noise levels computed by the first adder, and computing a CINR estimate for all the received signals.

17. A method for estimating a Carrier-to-Interference-and-Noise Ratio (CINR) in a communication system, comprising the steps of:
(a) blocking received signals based on sub-carriers with similar channel characteristics by blocking means;
(b) computing interference and noise levels on a block-by-block basis and true received signal levels on a block-by-block basis from the blocked received signals, by (b-1) measuring levels of the blocked received signals and computing and outputting a sum of the received signal levels, (b-2) estimating interference and noise levels of the blocked received signals and computing and outputting a sum of the interference and noise levels, and (b-3) subtracting the sum of the interference and noise levels from the sum of the received signal levels and outputting a true received signal level estimate by computing means; and
(c) estimating CINRs on a block-by-block basis using ratios between the computed interference and noise levels and the computed true received signal levels by estimating means.

18. The method of claim 17, wherein step (b-1) further comprises:
computing absolute values of the blocked received signals; and
squaring the absolute values to measure the levels of the blocked received signals.

19. The method of claim 17, wherein step (b-2) further comprises:
multiplying the blocked received signals by a pilot sequence to produce channel signals of the blocked received signals;
squaring a difference value between each of the produced channel signals and at least one adjacent channel signal; and dividing the squared value by a predetermined value according to a position of each of the blocked received signals to estimate interference and noise power of the blocked received signals.

20. The method of claim 19, wherein the predetermined value is set to 2 when a blocked received signal is located at a boundary of a block.

21. The method of claim 20, wherein step (c) comprises:
summing estimates of the computed interference and noise levels to produce a total interference and noise level estimate;
summing estimates of the computed true received signal levels to produce a total true received signal level estimate; and
dividing the total true received signal level estimate by the total interference and noise level estimate to compute a CINR estimate for all the received signals.

22. The method of claim 19, wherein the predetermined value is set to 6 when a blocked received signal is not located at a boundary of a block.

23. A method for estimating a Carrier-to-Interference-and-Noise Ratio (CINR) in a communication system, comprising the steps of:
(a) blocking received signals based on sub-carriers with similar channel characteristics by blocking means;
(b) computing interference and noise levels on a block-by-block basis and true received signal levels on a block-by-block basis from the blocked received signals by computing means; and
(c) computing a sum of the interference and noise levels and a sum of the true received signal levels to produce a total interference and noise level and a total true received signal level, and estimating a total CINR using a ratio of the total true received signal level to the total interference and noise level by computing means.

24. The method of claim 23, wherein step (b) comprises the steps of:
(b-1) measuring levels of the blocked received signals, and computing a sum of the received signal levels;
(b-2) estimating interference and noise levels of the blocked received signals, and computing a sum of the interference and noise levels; and
(b-3) subtracting the sum of the interference and noise levels from the sum of the received signal levels, and outputting true received signal level estimates for the blocked received signals.

25. The method of claim 24, wherein step (b-1) comprises:
computing absolute values of the blocked received signals; and
squaring the absolute values to measure the levels of the blocked received signals.

26. The method of claim 25, wherein step (c) comprises:
summing estimates of the computed interference and noise levels to produce a total interference and noise level estimate;
summing estimates of the computed true received signal levels to produce a total true received signal level estimate; and
dividing the total true received signal level estimate by the total interference and noise level estimate to compute a CINR estimate for all the received signals.

27. The method of claim 24, wherein step (b-2) comprises:
multiplying the blocked received signals by a pilot sequence to produce channel signals of the blocked received signals;

squaring a difference value between each of the produced channel signals and at least one adjacent channel signal; and dividing the squared value by a predetermined value according to a position of each of the blocked received signals to estimate interference and noise power of the blocked received signals.

28. The method of claim 27, wherein the predetermined value is set to 2 when a blocked received signal is located at a boundary of a block.

29. The method of claim 27, wherein the predetermined value is set to 6 when a blocked received signal is not located at a boundary of a block.

30. The method of claim 27, wherein step (c) comprises:

summing estimates of the computed interference and noise levels to produce a total interference and noise level estimate;

summing estimates of the computed true received signal levels to produce a total true received signal level estimate; and dividing the total true received signal level estimate by the total interference and noise level estimate to compute a CINR estimate for all the received signals.

31. The method of claim 24, wherein step (c) comprises:

summing estimates of the computed interference and noise levels to produce a total interference and noise level estimate;

summing estimates of the computed true received signal levels to produce a total true received signal level estimate; and dividing the total true received signal level estimate by the total interference and noise level estimate to compute a CINR estimate for all the received signals.

* * * * *

UNITED STATES PATENT AND TRADEMARK OFFICE
CERTIFICATE OF CORRECTION

PATENT NO. : 7,606,299 B2 Page 1 of 1
APPLICATION NO. : 11/172539
DATED : October 20, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Fifth Day of October, 2010

David J. Kappos
*Director of the United States Patent and Trademark Office*